(12) United States Patent
Mohan et al.

(10) Patent No.: US 11,856,111 B2
(45) Date of Patent: Dec. 26, 2023

(54) SYSTEMS AND METHODS FOR CONTEXT-SPECIFIC GRANULAR ACCESS TO FLIGHT MANAGEMENT SYSTEM USING ADAPTIVE IDENTITY MANAGEMENT

(71) Applicant: Honeywell International Inc., Charlotte, NC (US)

(72) Inventors: Rajeev Mohan, Bangalore (IN); Kirupakar Janakiraman, Madurai (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 272 days.

(21) Appl. No.: 17/246,161

(22) Filed: Apr. 30, 2021

(65) Prior Publication Data

US 2022/0166635 A1 May 26, 2022

Related U.S. Application Data

(60) Provisional application No. 63/116,690, filed on Nov. 20, 2020.

(51) Int. Cl.
*H04L 9/32* (2006.01)
*G06F 5/00* (2006.01)
*G06F 9/54* (2006.01)
*G07C 5/00* (2006.01)

(52) U.S. Cl.
CPC ............ *H04L 9/3268* (2013.01); *G06F 9/546* (2013.01); *G07C 5/008* (2013.01); *H04L 9/3213* (2013.01)

(58) Field of Classification Search
CPC . H04L 9/3213; H04L 9/3268; H04L 2209/84; G06F 21/31; G06F 9/546; G06F 2221/2141; G07C 5/008
See application file for complete search history.

(56) References Cited

U.S. PATENT DOCUMENTS

| | | |
|---|---|---|
| 10,089,886 B2 | 10/2018 | Kawalkar et al. |
| 10,523,785 B2 | 12/2019 | Coulmeau et al. |
| 10,797,945 B2 | 10/2020 | Toews et al. |
| 10,854,093 B2 | 12/2020 | Snyder et al. |
| 10,946,977 B2 | 3/2021 | Mohan et al. |

(Continued)

*Primary Examiner* — Mohammad A Siddiqi
(74) *Attorney, Agent, or Firm* — Lorenz & Kopf LLP

(57) ABSTRACT

Disclosed are methods, systems, and computer-readable medium for context-specific granular access to flight management system (FMS) SaaS using adaptive IAM. For instance, the method may include receiving, at one of a plurality of application programing interface (API) endpoints of a flight management system (FMS) software as a service (SaaS), a request from a client; determining whether the request is authorized; in response to determining the request is authorized, analyzing the request to determine a context of the request and determine whether the request includes an intent; transmitting a message to a particular functionality of the FMS SaaS based on the context and the intent; determining whether the client is associated with a subscription type; filtering a data stream from the FMS SaaS in accordance with the subscription type and the context; generating a response based on the filtered data stream; and transmitting the response to the client.

20 Claims, 8 Drawing Sheets

(56) References Cited

U.S. PATENT DOCUMENTS

| | | | |
|---|---|---|---|
| 2006/0080352 A1* | 4/2006 | Boubez | H04L 63/166 707/999.102 |
| 2011/0296172 A1* | 12/2011 | Fu | H04L 63/062 713/156 |
| 2014/0358798 A1* | 12/2014 | Anderson | G06Q 50/188 705/80 |
| 2015/0064656 A1* | 3/2015 | Garzella | G06Q 50/14 434/30 |
| 2015/0378714 A1* | 12/2015 | Katariya | H04L 67/34 717/170 |
| 2017/0063946 A1* | 3/2017 | Quan | H04L 67/55 |
| 2017/0186328 A1 | 6/2017 | Beernaert | |
| 2019/0052549 A1* | 2/2019 | Duggal | H04L 41/5019 |
| 2019/0164433 A1 | 5/2019 | MacDowell et al. | |
| 2020/0035116 A1 | 1/2020 | Sivaratri et al. | |
| 2020/0226940 A1* | 7/2020 | Srinivasan | G08G 5/0078 |
| 2020/0285571 A1 | 9/2020 | Mohan et al. | |
| 2020/0285996 A1* | 9/2020 | Janakiraman | B64D 43/00 |
| 2020/0301760 A1 | 9/2020 | Janakiraman et al. | |
| 2020/0342771 A1 | 10/2020 | Mohan et al. | |
| 2021/0110732 A1* | 4/2021 | Shamasundar | G09B 9/24 |
| 2023/0156464 A1* | 5/2023 | Faccin | H04L 63/062 380/270 |

\* cited by examiner

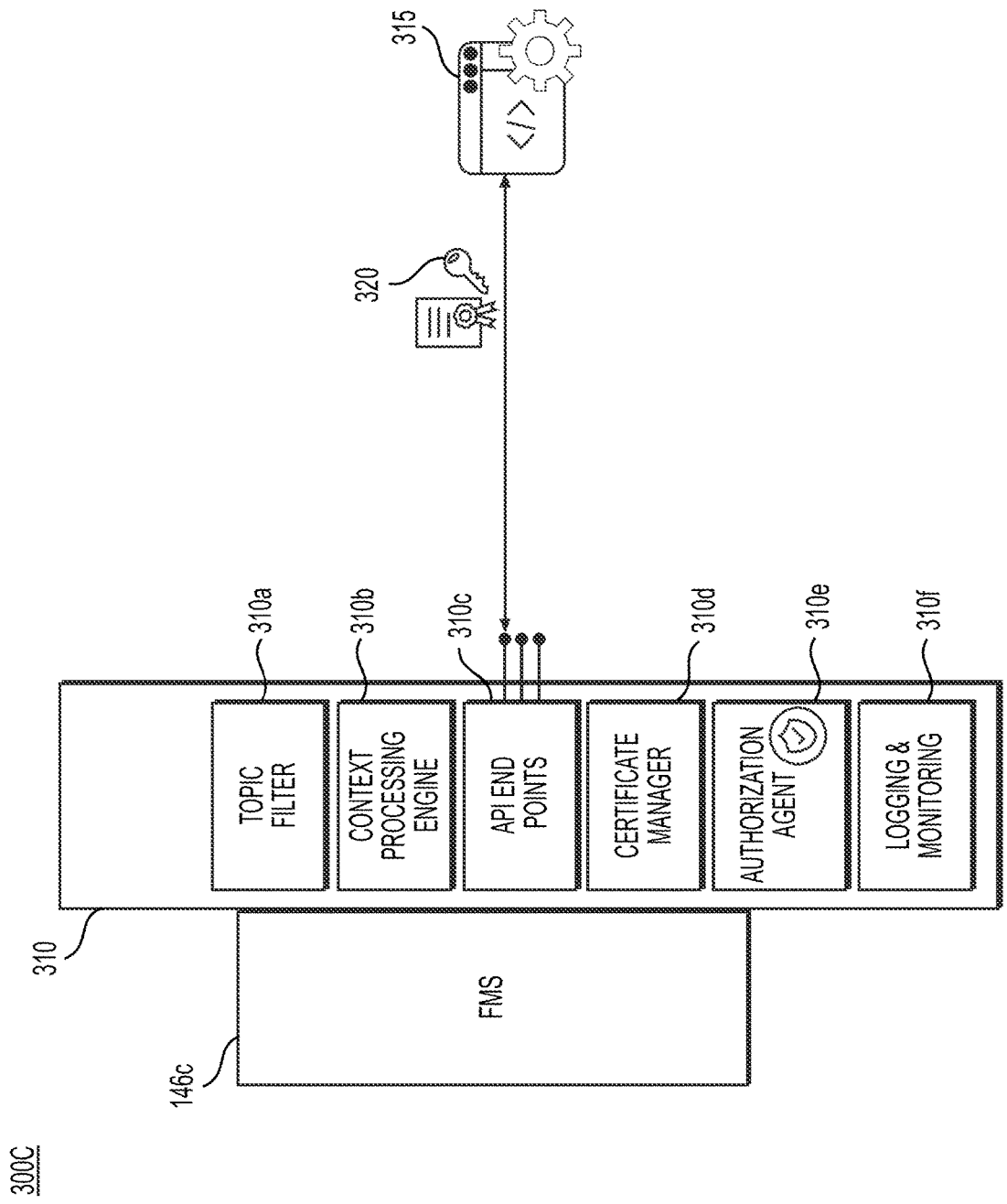

SYSTEMS AND METHODS FOR CONTEXT-SPECIFIC GRANULAR ACCESS TO FLIGHT MANAGEMENT SYSTEM USING ADAPTIVE IDENTITY MANAGEMENT

CROSS-REFERENCE TO RELATED APPLICATION(S)

This application claims the benefit of priority to U.S. Provisional Application No. 63/116,690, filed Nov. 20, 2020, which is incorporated herein by reference in its entirety.

TECHNICAL FIELD

Various embodiments of the present disclosure relate generally to context-specific granular access to software as a service (SaaS) using adaptive identity and asset management (IAM) and, more particularly, to context-specific granular access to a flight management system (FMS) SaaS using adaptive IAM.

BACKGROUND

Airlines, aircraft manufacturers, and others have an increasing desire to be able to access flight management systems (FMS) in an off-board or cloud environment, e.g., using an application programming interface (API), as opposed to only via avionics or other instrumentation in aircraft cockpits. As a result, API-based FMS has evolved into a software-as-a-service (SaaS) that is accessible from any location around the world. However, FMS SaaS has been limited by standardized input/output and functionality due to safety and other concerns. Moreover, FMS SaaS is not expected to change after certification, as modifications require re-certification, which can be costly in money and time (e.g., due to flight time, review, and certification). Finally, existing FMS SaaS may lack one or more of: a mechanism to authenticate applications interacting with FMS SaaS; a mechanism to authorize applications interacting with FMS SaaS; a mechanism context and intent based response to user queries; a mechanism for rate-limit usage per application; a mechanism for caching; a mechanism for data encryption; and/or a mechanism for data integrity check.

The present disclosure is directed to overcoming one or more of these above-referenced challenges.

SUMMARY OF THE DISCLOSURE

According to certain aspects of the disclosure, systems, methods, and computer-readable medium are disclosed for context-specific granular access to SaaS using adaptive identity and asset management (IAM).

For instance, a method may include: receiving, at one of a plurality of application programing interface (API) endpoints of a flight management system (FMS) software as a service (SaaS), a request from a client; determining whether the request is authorized; in response to determining the request is authorized, analyzing the request to determine a context of the request and determine whether the request includes an intent; in response to determining the context and determining the request includes the intent, transmitting a message to a particular functionality of the FMS SaaS based on the context and the intent; in response to determining the request includes the intent, determining whether the client is associated with a subscription type; in response to determining the client is associated with the subscription type, filtering a data stream from the FMS SaaS in accordance with the subscription type and the context; generating a response based on the filtered data stream; and transmitting the response to the client.

A system may include at least one memory storing instructions; and at least one processor executing the instructions to perform a process. The process may include: receiving, at one of a plurality of application programing interface (API) endpoints of a flight management system (FMS) software as a service (SaaS), a request from a client; determining whether the request is authorized; in response to determining the request is authorized, analyzing the request to determine a context of the request and determine whether the request includes an intent; in response to determining the context and determining the request includes the intent, transmitting a message to a particular functionality of the FMS SaaS based on the context and the intent; in response to determining the request includes the intent, determining whether the client is associated with a subscription type; in response to determining the client is associated with the subscription type, filtering a data stream from the FMS SaaS in accordance with the subscription type and the context; generating a response based on the filtered data stream; and transmitting the response to the client.

A non-transitory computer-readable medium may store instructions that, when executed by a processor, cause the processor to perform a method. The method may include: receiving, at one of a plurality of application programing interface (API) endpoints of a flight management system (FMS) software as a service (SaaS), a request from a client; determining whether the request is authorized; in response to determining the request is authorized, analyzing the request to determine a context of the request and determine whether the request includes an intent; in response to determining the context and determining the request includes the intent, transmitting a message to a particular functionality of the FMS SaaS based on the context and the intent; in response to determining the request includes the intent, determining whether the client is associated with a subscription type; in response to determining the client is associated with the subscription type, filtering a data stream from the FMS SaaS in accordance with the subscription type and the context; generating a response based on the filtered data stream; and transmitting the response to the client.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 3A-3D depict exemplary schematic block diagrams of the framework of the IoT platform of the networked computing system environment of FIG. 1 for context-specific granular access to FMS SaaS using adaptive IAM, according to one or more embodiments.

DETAILED DESCRIPTION OF EMBODIMENTS

Figure 1:
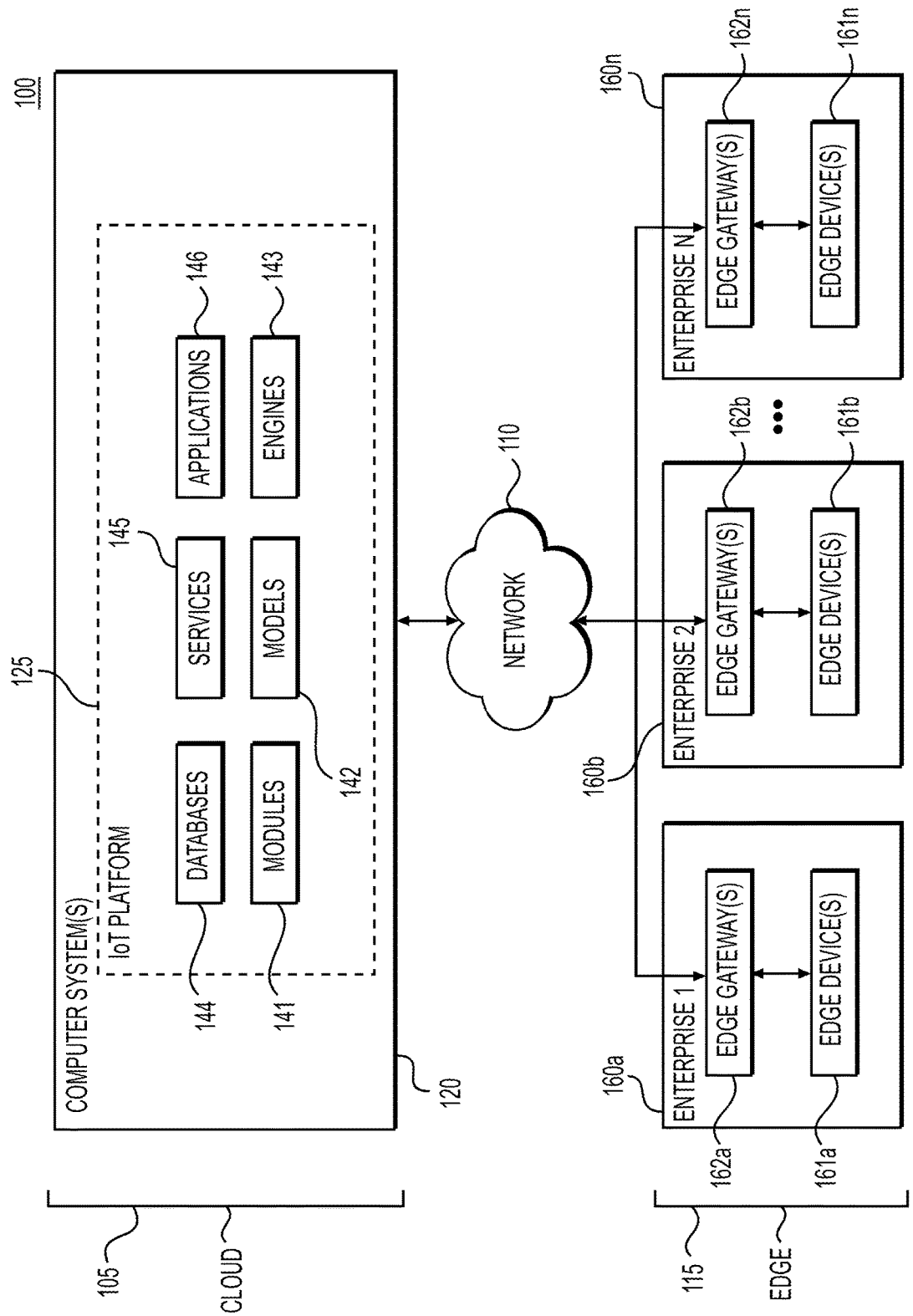
FIG. 1 depicts an exemplary networked computing system environment, according to one or more embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Various embodiments of the present disclosure relate generally to context-specific granular access to SaaS using adaptive IAM. As an exemplary embodiment, the present disclosure is directed to context-specific granular access to FMS SaaS using adaptive IAM and an API gateway. Generally, FMS SaaS performs periodic computations based on predefined rates and provides all the generated data for consumption through the API gateway at specific predefined rates. The FMS SaaS may allow inputs from highly trusted external clients to modify its internal state (e.g., such as pilots, with a pilot in loop mechanism). The FMS SaaS may also allow for inputs to specific functionality, such as What-if scenarios to be executed based on client inputs. In the present disclosure, the API Gateway is responsible for pulling and pushing data into the FMS SaaS and out to the client devices. However, it is expected that the FMS SaaS has standardized input/output and functionality FMS SaaS is not expected to change after certification, as modifications require re-certification, which can be costly in money and time (e.g., due to flight time, review, and certification). Therefore, the API Gateway is responsible for ensuring clients are provided granular access based on their individual permissions, with each set of permissions allowing variable levels of data access, while also providing intent and context derived responses to requests for FMS SaaS services.

While this disclosure describes the systems and methods with reference to FMS SaaS and/or aircraft, it should be appreciated that the present systems and methods are applicable to other avionic SaaS, SaaS in general, and vehicles, including those of drones, automobiles, ships, or any other autonomous and/or Internet-connected vehicles.

In general, the present disclosure describes the present FMS SaaS being disposed in communication with an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

FIG. 1 illustrates an exemplary networked computing system environment 100, according to the present disclosure. As shown in FIG. 1, networked computing system environment 100 is organized into a plurality of layers including a cloud layer 105, a network layer 110, and an edge layer 115. As detailed further below, components of the edge 115 are in communication with components of the cloud 105 via network 110.

Network 110 may be any suitable network or combination of networks and may support any appropriate protocol suitable for communication of data to and from components of the cloud 105 and between various other components in the networked computing system environment 100 (e.g., components of the edge 115). Network 110 may include a public network (e.g., the Internet), a private network (e.g., a network within an organization), or a combination of public and/or private networks. Network 110 may be configured to provide communication between various components depicted in FIG. 1. Network 110 may comprise one or more networks that connect devices and/or components in the network layout to allow communication between the devices and/or components. For example, the network 110 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 may be implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, computer systems 120 may include any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, the processors and data storage devices may comprise any type or combination of application servers, communication servers, web servers, supercomputing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, the software components of computer systems 120 may include one or more software modules to communicate with user devices and/or other computing devices through network 110. For example, the software components may include one or more modules 141, models 142, engines 143, databases 144, services 145, and/or applications 146, which may be stored in/by the computer systems 120 (e.g., stored on the memory), as detailed with respect to FIG. 2 below. The one or more processors may be configured to utilize the one or more modules 141, models 142, engines 143, databases 144, services 145, and/or applications 146 when performing various methods described in this disclosure.

Accordingly, computer systems 120 may execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 may be combined to form fewer modules, models, engines, databases, services, and/or applications. In some embodiments, some of the modules 141, models 142, engines 143, databases 144, services 145, and/or applications 146 may be separated into separate, more numerous modules, models, engines, databases, services, and/or applications. In some embodiments, some of the modules 141, models 142, engines 143, databases 144, services 145, and/or applications 146 may be removed while others may be added.

The computer systems 120 are configured to receive data from other components (e.g., components of the edge 115) of networked computing system environment 100 via network 110. Computer systems 120 are further configured to utilize the received data to produce a result. Information indicating the result may be transmitted to users via user computing devices over network 110. In some embodiments, the computer systems 120 may be referred to as a server system that provides one or more services including providing the information indicating the received data and/ or the result(s) to the users. Computer systems 120 are part of an entity, which may include any type of company, organization, or institution that implements one or more IoT services. In some examples, the entity may be an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n may represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or vehicle that includes any number of local devices.

Figure 2:
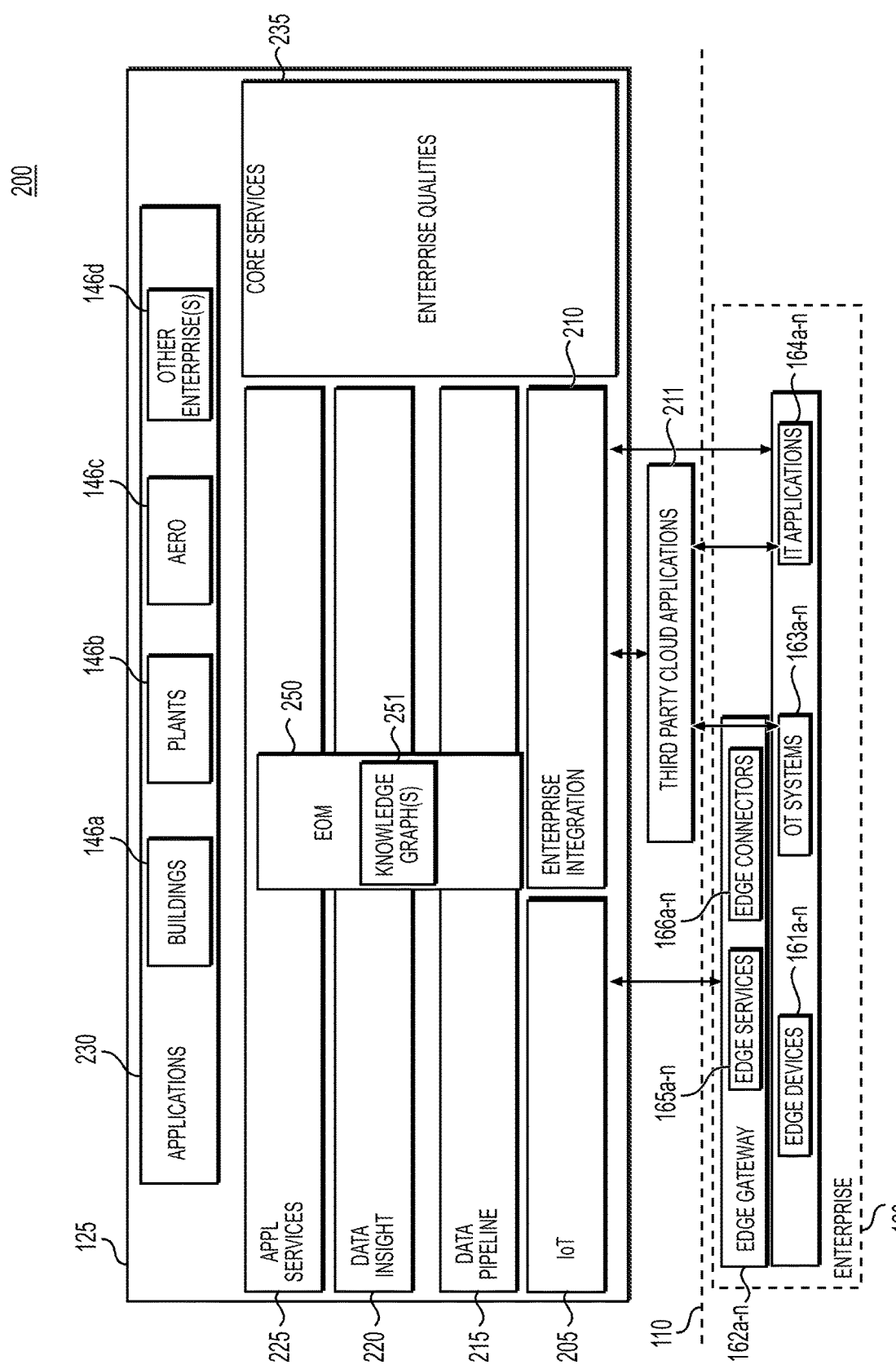
FIG. 2 depicts a schematic block diagram of a framework of an IoT platform of the networked computing system environment of FIG. 1.

The edge devices 161a-161n may represent any of a variety of different types of devices that may be found within the enterprises 160a-160n. Edge devices 161a-161n are any type of device configured to access network 110, or be accessed by other devices through network 110, such as via an edge gateway 162a-162n. Edge devices 161a-161n may be referred to in some cases as "IoT devices," which may therefore include any type of network-connected (e.g., Internet-connected) device. For example, the edge devices 161a-161n may include sensors, actuators, processors, computers, valves, pumps, ducts, vehicle components, cameras, displays, doors, windows, security components, HVAC components, factory equipment, and/or any other devices that may be connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, the edge 115 may also include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. The communication interfaces of the edge gateways 162a-162n may include one or more cellular radios, Bluetooth, WiFi, near-field communication radios, Ethernet, or other appropriate communication devices for transmitting and receiving information. Multiple communication interfaces may be included in each gateway 162a-162n for providing multiple forms of communication between the edge devices 161a-161n, the gateways 162a-162n, and the cloud 105 via network 110. For example, communication may be achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

The edge gateways 162a-162n may also include a processor and memory for storing and executing program instructions to facilitate data processing. For example, the edge gateways 162a-162n can be configured to receive data from the edge devices 161a-161n and process the data prior to sending the data to the cloud 105. Accordingly, the edge gateways 162a-162n may include one or more software modules or components for providing data processing services and/or other services or methods of the present disclosure. With reference to FIG. 2, each edge gateway 162a-162n includes edge services 165a-165n and edge connectors 166a-166n. The edge services 165a-165n may include hardware and software components for processing the data from the edge devices 161a-161n. The edge connectors 166a-166n may include hardware and software components for facilitating communication between the edge gateway 162a-162n and the cloud 105 via network 110, as detailed above. In some cases, any of edge devices 161a-n, edge connectors 166a-n, and edge gateways 162a-n may have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, each layer 205-235 may include one or more of the modules 141, models 142, engines 143, databases 144, services 145, applications 146, or combinations thereof. In some embodiments, the layers 205-235 may be combined to form fewer layers. In some embodiments, some of the layers 205-235 may be separated into separate, more numerous layers. In some embodiments, some of the layers 205-235 may be removed while others may be added.

The IoT platform 125 is a model-driven architecture. Thus, the extensible object model 250 communicates with each layer 205-230 to contextualize site data of the enterprise 160a-160n using an extensible object model (or "asset model") and knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 may include resource description framework (RDF) graphs. As used herein, a "RDF graph" is a graph data model that formally describes the semantics, or meaning, of information. The RDF graph can also represent metadata (e.g., data that describes data). Knowledge graphs 251 can also include a semantic object model. The semantic object model is a subset of a knowledge graph 251 that defines semantics for the knowledge graph 251. For example, the semantic object model defines the schema for the knowledge graph 251.

As used herein, EOM 250 is a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, the model can describe the type of sensors mounted on any given asset (e.g., edge device 161a-161n) and the type of data that is being sensed by each sensor. A key performance indicator (KPI) framework can be used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 can understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 250 can automatically map the tag to the attribute based on naming conventions, parsing, and matching the tag and attribute descriptions and/or by comparing the behavior of the time series data with expected behavior.

The modeling phase includes an onboarding process for syncing the models between the edge 115 and the cloud 105. For example, the onboarding process can include a simple onboarding process, a complex onboarding process, and/or a standardized rollout process. The simple onboarding process includes the knowledge graph 250 receiving raw model data from the edge 115 and running context discovery algorithms to generate the model. The context discovery algorithms read the context of the edge naming conventions of the edge devices 161a-161n and determine what the naming conventions refer to. For example, the knowledge graph 250 can receive "TMP" during the modeling phase and determine that "TMP" relates to "temperature." The generated models are then published. The complex onboarding process includes the knowledge graph 250 receiving the raw model data, receiving point history data, and receiving site survey data. The knowledge graph 250 can then use these inputs to run the context discovery algorithms. The generated models can be edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, data can be ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT platform 205. In some embodiments, only authorized data is sent to the IoT platform 125, and the IoT platform 125 only accepts data from authorized edge gateways 162a-162n and/or edge devices 161a-161n. Data may be sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. The IoT layer 205 may also include components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third party cloud applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, the data pipeline layer 215 can pre-process and/or perform initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. The enterprise-specific digital twins can include a reliability advisor containing process models to determine the current operation and the fault models to trigger any early detection and determine an appropriate resolution. The digital twins can also include an optimization advisor that integrates real-time economic data with real-time process data, selects the right feed for a process, and determines optimal process conditions and product yields.

The data pipeline layer 215 may also use models and templates to define calculations and analytics, and define how the calculations and analytics relate to the assets (e.g., the edge devices 161a-161n). For example, a pump template can define pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. The actual calculation or analytic logic may be defined in the template or it may be referenced. Thus, the calculation model can be used to describe and control the execution of a variety of different process models. Calculation templates can be linked with the asset templates such that when an asset (e.g., edge device 161a-161n) instance is created, any associated calculation instances are also created with their input and output parameters linked to the appropriate attributes of the asset (e.g., edge device 161a-161n).

The IoT platform 125 can support a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, the IoT platform 125 can drill down from a high-level condition to understand the contributing factors, as well as determining the potential impact a lower level condition may have. There may be multiple fault models for a given enterprise 160a-160n looking at different aspects such as process, equipment, control, and/or operations. Each fault model can identify issues and opportunities in their domain, and can also look at the same core problem from a different perspective. An overall fault model can be layered on top to synthesize the different perspectives from each fault model into an overall assessment of the situation and point to the true root cause.

When a fault or opportunity is identified, the IoT platform 125 can make recommendations about the best corrective actions to take. Initially, the recommendations are based on expert knowledge that has been pre-programmed into the system by process and equipment experts. A recommendation services module presents this information in a consistent way regardless of source, and supports workflows to track, close out, and document the recommendation follow-up. The recommendation follow-up can be used to improve the overall knowledge of the system over time as existing recommendations are validated (or not) or new cause and effect relationships are learned by users and/or analytics.

The models can be used to accurately predict what will occur before it occurs and interpret the status of the installed base. Thus, the IoT platform 125 enables operators to quickly initiate maintenance measures when irregularities occur. The digital twin architecture of the IoT platform 125 can use a variety of modeling techniques. The modeling techniques can include, for example, rigorous models, fault detection and diagnostics (FDD), descriptive models, predictive maintenance, prescriptive maintenance, process optimization, and/or any other modeling technique.

The rigorous models can be converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. The descriptive models identify a problem and then the predictive models can determine possible damage levels and maintenance options. The descriptive models can include models for defining the operating windows for the edge devices 161a-161n.

Predictive maintenance includes predictive analytics models developed based on rigorous models and statistic models, such as, for example, principal component analysis (PCA) and partial least square (PLS). Machine learning methods can be applied to train models for fault prediction. Predictive maintenance can leverage FDD-based algorithms to continuously monitor individual control and equipment performance. Predictive modeling is then applied to a selected condition indicator that deteriorates in time. Prescriptive maintenance includes determining what is the best maintenance option and when it should be performed based on actual conditions rather than time-based maintenance schedule. Prescriptive analysis can select the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. When raw data is received at the IoT platform 125, the raw data can be stored as time series tags or events in warm storage (e.g., in a TSDB) to support interactive queries and to cold storage for archive purposes. Data can further be sent to the data lakes for offline analytics development. The data pipeline layer 215 can access the data stored in the databases of the data insight layer 220 to perform analytics, as detailed above.

The application services layer 225 includes one or more components for rules engines, workflow/notifications, KPI framework, BI, machine learning, and/or an API for application services. The application services layer 225 enables building of applications 146a-d. The applications layer 230 includes one or more applications 146a-d of the IoT platform 125. For example, the applications 146a-d can include a buildings application 146a, a plants application 146b, an aero application 146c, and other enterprise applications 146d. The applications 146 can include general applications 146 for portfolio management, asset management, autonomous control, and/or any other custom applications. Portfolio management can include the KPI framework and a flexible user interface (UI) builder. Asset management can include asset performance and asset health. Autonomous control can include energy optimization and predictive maintenance. As detailed above, the general applications 146 can be extensible such that each application 146 can be configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. The core services 235 can include data visualization, data analytics tools, security, scaling, and monitoring. The core services 235 can also include services for tenant provisioning, single login/common portal, self-service admin, UI library/UI tiles, identity/access/entitlements, logging/monitoring, usage metering, API gateway/dev portal, and the IoT platform 125 streams.

Figure 3A:
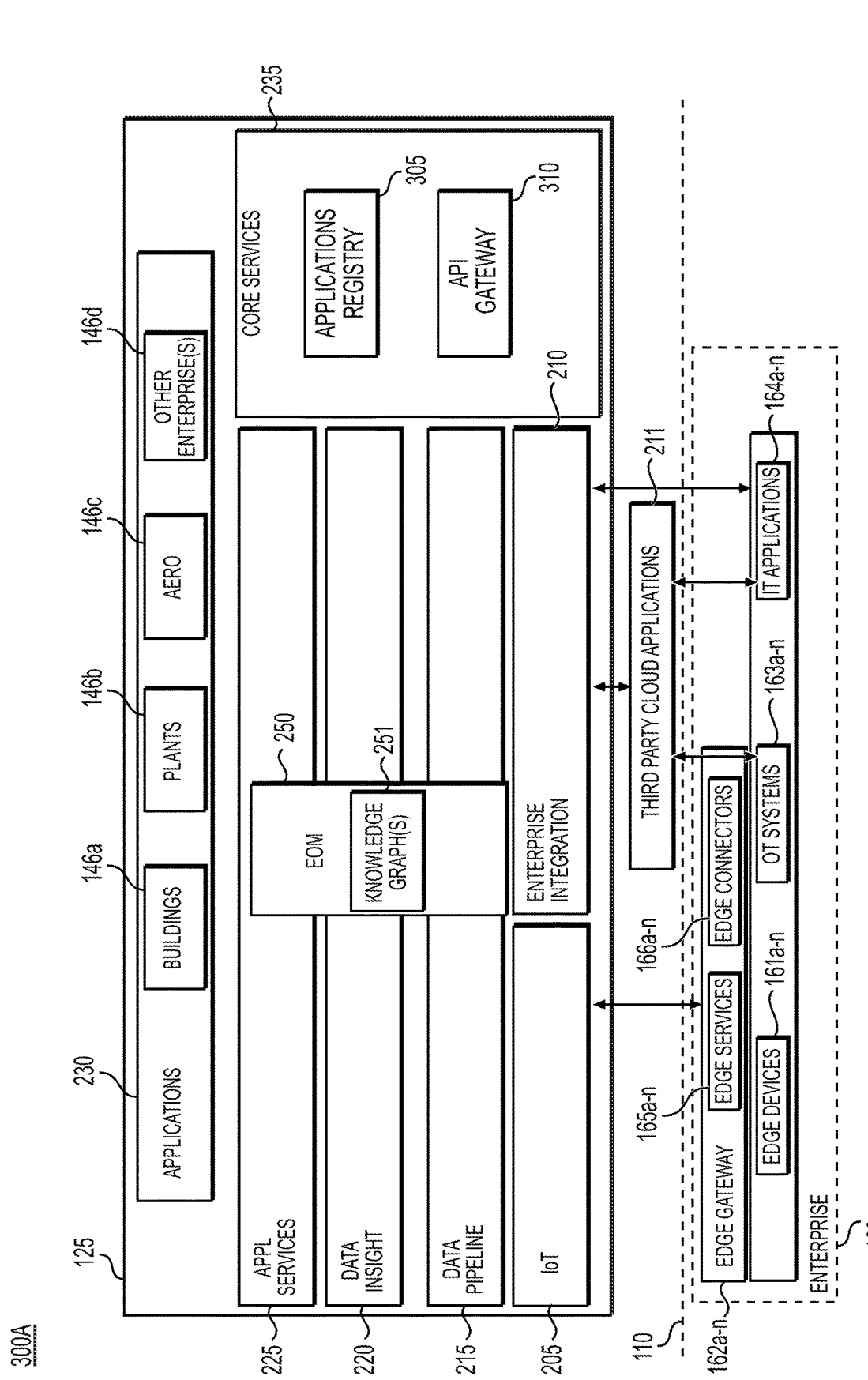

FIGS. 3A-3D depict exemplary schematic block diagrams of the framework of the IoT platform of the networked computing system environment of FIG. 1 for context-specific granular access to FMS SaaS using adaptive IAM, according to one or more embodiments. In particular, as depicted in FIG. 3A, the core services layer 235 includes an applications registry 305 (alternatively, called "identity and access management (IAM) system") and an API gateway 310. The applications registry 305 and the API gateway 310 work together to provide context-specific granular access to FMS SaaS using adaptive IAM via a plurality of clients 315 (hereinafter "clients" or "client" for a single device). In this case, the FMS SaaS is a particular set of functionality hosted, for example, by the aero application 146c. One of skill in the art would recognize that the applications registry 305 and the API gateway 310 could be combined with (or configured to manage data communications with) the aero application 146c (to work with all functionalities offered by the aero application 146c), combined with (or configured to manage data communications with) the FMS SaaS in particular, or combined with (or configured to manage data communications with) any or all of the one or more applications 146a-d of the applications layer 230 of the IoT platform 125. Therefore, in the remainder of this disclosure, the FMS SaaS will be referred to as the FMS SaaS 146c, though one of skill in the art would recognize that the one or more applications 146a-d and/or particular functionality provided by the one or more applications 146a-d may also use the API gateway 310 and the applications registry 305, or duplicated copies of the API gateway 310 and the applications registry 305 for respective applications 146a-d.

The plurality of clients 315 are any of the edge devices 161a-n, the OT systems 163a-163n, and/or the IT applications 164a-164n of each enterprise 161a-161n, discussed above. In particular, the plurality of clients 315 are one or combinations of airline applications; on-board devices, such as original equipment manufacturer (OEM) devices, executing client applications; third party applications; and/or cloud API user applications for user devices of enterprises 161a-161n. For instance, the user devices may be personal computers, mobile phones, and/or tablets running the cloud API user applications, such as electronic flight bag (EFB) applications, FMS applications, etc. The on-board devices may execute particular functionality for aircraft (or vehicles in general), such as navigation systems, ground proximity warning systems, FMSs, etc. The airline applications may include flight and/or fleet management applications to manage aircraft associated with an operator. The third party applications may include any third party service application, such as a weather application, a traffic application, etc.

Figure 3B:
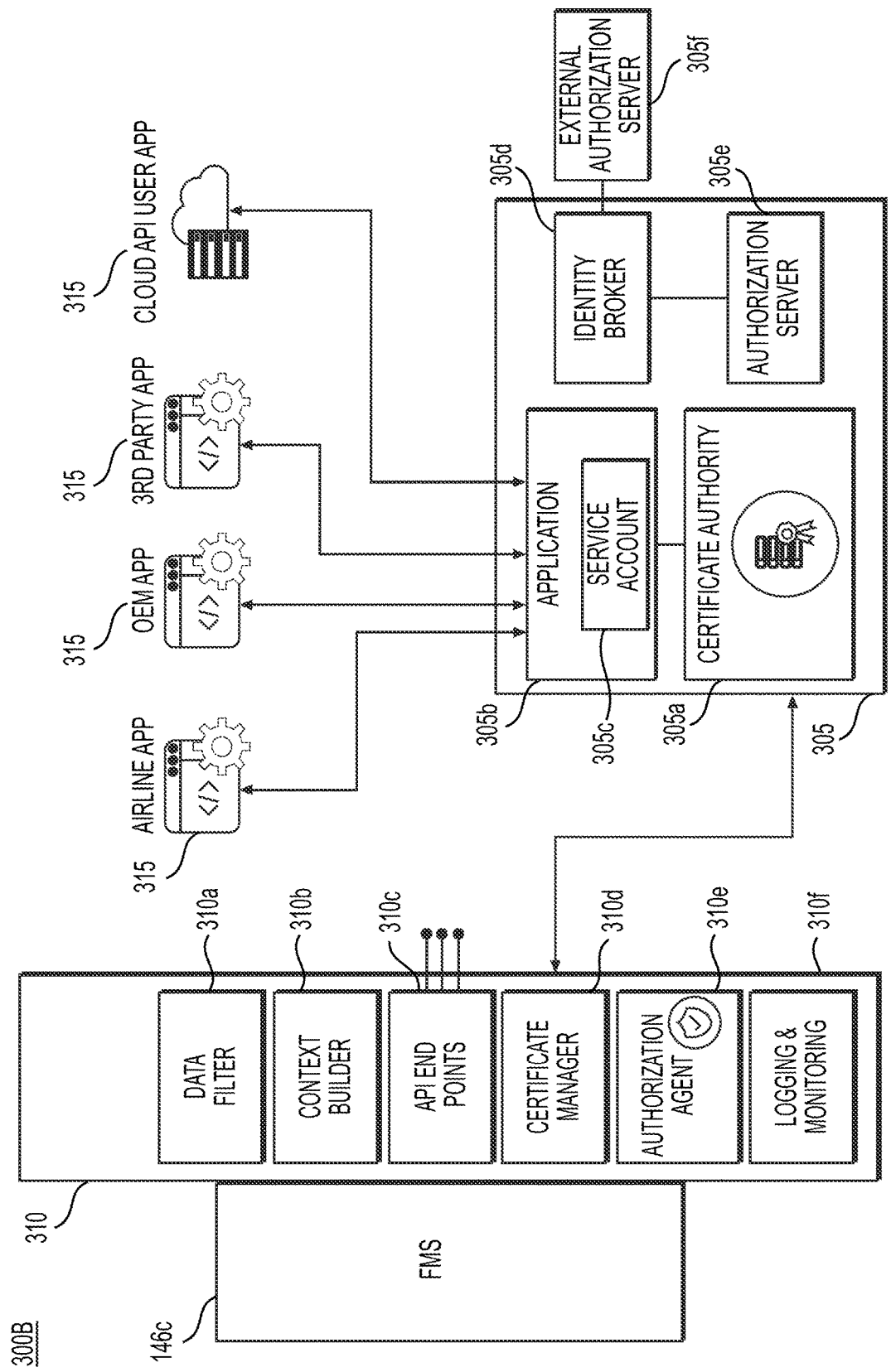

FIG. 3B depicts system 300B comprising the FMS 146c connected to the API gateway 310, the applications registry 305 connected to the API gateway 310, and the plurality of clients 315 connected to the applications registry 305. In particular, the API gateway 310 has an API manager (e.g., a module discussed above) that includes a topic filter 310a, a context processing engine 310b, a plurality of API endpoints 310c, a certificate manager 310d, an authorization agent 310e, and a logging and monitoring module 310f. In particular, the applications registry 305 includes a certificate authority 305a, an application 305b with a service account 305c, an identity broker 305d, and an authorization server 305e. The applications registry 305 may also cooperate with an external authorization server 305f. As depicted in FIG. 3B, the applications registry 305, using IAM processes, manages data security for the plurality of clients 315 and the API gateway 310. The applications registry 305 manages data security by issuing certificates and/or tokens to the plurality of clients 315 and the API gateway 310, so that (1) the plurality of clients 315 know data from the API gateway 310 is secure; and (2) the API gateway 310 knows the plurality of clients 315 are authorized to invoke particular API functionality.

The certificate authority 305a assigns the API gateway 310 (and/or the FMS SaaS 146c) a unique certificate. The unique certificate enables the plurality of clients 315 to verify authenticity of data transmitted by the API gateway 310/generated by the FMS SaaS 146c, as the data is encrypted using, e.g., asymmetric cryptic keys of the unique certificate with public keys of clients 315 (discussed below).

The application 305b manages interactions between the clients 315 and the certificate authority 305a and/or the identity broker 305d. In particular, the application 305b receives requests to register from the clients 315; transmit a request to the identity broker 305d to authenticate the requesting client 315; receive a reply message from the identity broker 305d, indicating authorization or denial of authorization for the requesting client 315; and transmit an output message to the requesting client 315, indicating successful authorization or the denial of authorization.

The identity broker 305d works with the authorization server 305e and/or the external authorization server 305f to authenticate individual clients 315 of the plurality of clients 315. For instance, particular clients 315 of an enterprise 160 of the plurality of clients 315 may be allowed to authenticate themselves, through the identity broker 305d, using the external authorization server 305f of the enterprise 160. The authorization server 305e and/or the external authorization server 305f authenticate individual clients 315 by, e.g., login-in processes or device identity processes (e.g., IP address, MAC address, etc. checking) to confirm an identity of the client 315.

If the requesting client 315 is successfully authorized, the application 305b proceeds to request a unique certificate for the requesting client 315 (or to request a re-issue of an expired unique certificate) to the certificate authority 305a. The certificate authority 305a generates (or re-issue) the unique certificate for the requesting client 315; store a mapping between the requesting client 315 and the unique certificate (e.g., mapping certificate ID, device ID, and/or user ID to the unique certificate); and transmit the unique certificate for the requesting client 315 to the application 305b. The application 305b receives the unique certificate for the requesting client 315 from the certificate authority 305a; and transmits the unique certificate for the requesting client 315 to the requesting client 315.

If the requesting client 315 receives the unique certificate for the requesting client 315, the client 315 then generates tokens based on unique certificate for the requesting client 315. For instance, the tokens are generated by a client identification (ID) and a client secret. The client secret corresponds to a public key of the unique certificate for the requesting client 315. Moreover, the client ID corresponds to a particular API invocation of the FMS SaaS 146c, and the client 315 may be informed (at issuance of the unique certificate or periodically) of a plurality of client IDs corresponding to a plurality of API invocations of the FMS SaaS 146c. The plurality of client IDs may be for functionality the client 315 is permitted to use or for all functionality. The plurality of client IDs may be unique client IDs for a particular client 315, for all clients 315 associated with the enterprise 160, and/or unique client IDs for all clients 315 (such that the client IDs are unique to each functionality requestable on the FMS SaaS).

The client 315 (or an authorized manager/device of an authorized manager of an enterprise 160 that the client 315 is associated with) views and manages permissions in the service account 305c of the application 305b. The permissions indicate (for particular clients 315 and/or for clients 315 associated with the enterprise 160) one or combinations of: types of functionality that may be requested (e.g., subsets of functionality that are permitted to be requested of all functionality of the FMS SaaS 146c); request rates (e.g., maximum number of requests per unit of time) of requests for functionality (in general or for particular types of functionality); levels of priority for processing of requests (in general or for particular types of functionality); and/or time frames for when requests may be made (in general or for particular types of functionality). A set of permissions are used to generate permission rules so that the API manager can track and enforce the set of permissions. Generally, a particular set of permissions may correspond to a particular subscription type. The permissions/subscription type may be selected by a user of the client 315 or by the authorized manager of the enterprise. The permissions/subscription type may be based on agreements between the enterprise 160 and the IoT platform 125.

The applications registry 305 transmits, to the API gateway 310, updates for permissions for functionality for particular clients 315 and/or for clients 315 associated with the enterprise 160 in accordance with the permissions maintained by the service account 305c. For instance, the applications registry 305 transmits the updates as permissions are changed (e.g., a request rate is increased or decreased), added (e.g., a particular functionality is added to a subscription), or deleted (e.g., a particular functionality is removed from a subscription). The applications registry 305 may also transmit, to the API gateway 310, updates to the unique certificates for the particular clients 315 and/or for clients 315 associated with the enterprise 160. For instance, the applications registry 305 may transmit the updates to the unique certificates as unique certificates are issued for clients 315, unique certificates for clients 315 lapse (e.g., expire) and are considered no longer valid, unique certificates for clients 315 are terminated (e.g., if a subscription has ended) and are considered no longer valid.

Clients 315 receive user inputs and/or system inputs; in response to receiving user inputs and/or system inputs, generate requests 320 based on the user inputs and/or the system inputs; and transmit the requests 320 to the API gateway 310 via network 110 and/or aircraft interface device (hereinafter "AID"). The AID may be gateways that enable clients 315, e.g., onboard aircraft, in a hanger/parking facility, etc., to communicate with the network 110 and the API gateway 310. For instance, clients 315 have a user interface to receive a user input requesting particular FMS SaaS functionality, such as a flight planning functionality, flight optimization functionality, or any other functionality provided by the FMS SaaS 146c. Additionally or alternatively, the clients 315 may receive a system input (e.g., a request from a software component, such as an EFB or on-board FMS) requesting the particular FMS SaaS functionality. For instance, an EFB or on-board FMS may automatically and programmatically (e.g., based on a trigger for a software component) request a FMS SaaS functionality to update FMS data for the software component. The clients 315 generate the request 320 by generating the token as discussed above and formatting the request 320 in accordance with an API protocol (e.g., a define manner to package a message). The clients 315 include, in a header of the request 315, a certificate ID, a device ID, and/or a user ID associated with the client 315 sending the message. The clients 315 include, in a body of the request 315, request data including user entered data and/or system generated data. The request data may include text, speech, and/or video. The system generated data may include data defined by software components of the client 315 to be transmitted in requests for FMS SaaS functionality, such as GPS data, radar data, system warnings, alarms, alerts, etc. as defined by the software components of the client 315. The clients 315 encrypts the request 320 using the client secret and a public key of the API gateway 310/FMS SaaS 146c.

FIG. 3B depicts system 300C comprising the FMS 146c connected to the API gateway 310, and an client 315 (of the plurality of clients 315) connected an API endpoint 315c of the API endpoints 315c of the API gateway 310. As depicted in FIG. 3C, the API gateway 310 is configured to manage requests 320 for particular API invocations of the FMS SaaS 146c from clients 315. The API gateway 310, using the API manager, receives a request 320 from a client 315 at one or more of the plurality of API endpoints 310c; determines whether the request 320 is authorized; if authorized, analyzes the request 320 to determine a context of the request 320 and determine whether the request 320 includes an intent; in response to determining the context and/or if the intent is determined, transmits a message to a particular functionality of the FMS SaaS 146c based on the context and the intent; if the intent is determined, determines whether the client 315 is associated with a subscription type; if the client 315 is associated with a subscription type, filters a data stream from the FMS SaaS 146c in accordance with the subscription type and the context; generates a response based on the filtered data stream; and transmits the response to the client 315. Therefore, the API manager improves efficiency by: (1) avoiding re-certifying the FMS SaaS functionality as functions in the API gateway enable differentiated responses based on context, intent, and priority; and (2) reduces contextual communication/data gathering by determining the context based on contextual parameters already hosted by the FMS SaaS or provided in the request. The API manager also improves safety and security by confirming an identity and enforcing unique certificate use between the API gateway 310 and the clients 315.

The plurality of API endpoints 310c are addresses (e.g., IP addresses) to receive requests 320 in accordance with the API protocol across the network 110. The plurality of API endpoints 310c correspond to particular API invocations of the FMS SaaS 146c, and/or some of the plurality of API endpoints 310c may correspond to subsets of the particular API invocations of the FMS SaaS 146c. The API manager manages received requests 320 at the plurality of API endpoints 310c and generate responses to the clients 315 that requested the requests 320.

The certificate manager 310d of the API manager, to determine whether the request is authorized: requests from applications registry 305 a unique certificate for the client 315 that transmitted the request 320 and/or accesses a repository of the certificate manager 310d to retrieve the unique certificate for the client 315 that transmitted the request 320; in response to obtaining the unique certificate from the applications registry 305 or the repository of the certificate manager 310d, processes the request 320 to obtain a token (e.g., by parsing the request 320 in accordance with the API protocol); determines whether the token is valid based on the unique certificate and a private key of FMS SaaS; and in response to determining the token is valid, determines the request is authorized.

For instance, the certificate manager 310d is updated by the applications registry 305 to include unique certificates for the plurality of clients 315, as discussed above. Moreover, the certificate manager 310d retrieves the unique certificate for the client 315 from the repository by matching a certificate ID, device ID, and/or a user ID (included in the request 320 and parsed out from the request) to stored certificate IDs, device IDs and/or user IDs stored in a mapped relationship to unique certificates. The certificate manager 310d processes the request 320 to obtain the token by parsing the request 320 in accordance with the API protocol. The certificate manager 310d determines whether the token is valid or not in accordance with asymmetric cryptic key algorithms based on public keys of the unique certificates and a private key of the certificate manager (discussed above). The certificate manager 310d may also check data input integrity by confirming the request 320 is properly formatted and includes necessary parameters (e.g., token, user ID, request data). The certificate manager 310d may also check client 315 validity (e.g., identity) by requesting the client 315 to re-confirm identity via the applications registry 305 (as discussed above). If the token returns invalid, the request 320 is improperly formatted, or the client 315 fails to re-confirm identity, the certificate manager 310d determines the request 320 is not authorized. Moreover, if the token returns valid, the request 320 is properly formatted, and the client 315 successfully re-confirms identity, the certificate manager 310d determines the request is authorized. In the case the certificate manager 310d determines the request is authorized, the API manager continues to process the request 320. In the case the certificate manager 310d determines the request is not authorized, the API manager transmits a response indicating (1) unauthorized, (2) improperly formatted request, and/or (3) a necessity to re-confirm identity, and then wait for a next request 320 to process. Therefore, the API manager improves efficiency by exiting the process before processing bad data (e.g., not formatted correctly), which would require additional processing in the FMS SaaS. The API manager also improves safety and security by confirming an identity and enforcing unique certificate use between the API gateway 310 and the clients 315.

The context processing engine 310b of the API manager, to analyze the request 320 to determine whether the request includes the intent: processes the request to obtain a token and request data from the request; analyzes the token to determine whether the token includes a client ID corresponding to a particular API invocation of the FMS SaaS;

and, in response to determining the token includes the client ID, analyzes the request data and the client ID to determine the intent.

For instance, the context processing engine 310b process the request 320 to obtain the token and the request data from the request by parsing the request 320 in accordance with the API protocol. The context processing engine 310b analyzes the token to determine whether the token includes the client ID corresponding to the particular API invocation of the FMS SaaS by: extracting a client ID from the token; obtain ID-API mapping data (including a mapping of client IDs to API invocations of the FMS SaaS); determine whether the extracted client ID maps to an API invocations using the ID-API mapping data; if the client ID maps, determine the token includes the client ID corresponding to the particular API invocation of the FMS SaaS that is the mapped API invocation; if the client ID does not map, determine the token does not include the client ID corresponding to a particular API invocation of the FMS SaaS.

If the token does include the client ID, the context processing engine 310b analyzes the request data and the client ID to determine the intent by using a first knowledge database and/or first behavior models. The first knowledge database includes first mapping data including defined relationships between particular inputs (e.g., particular client ID and data types of the request data) and particular outputs (determine a particular intent). The behavior models are statistical models and/or machine learning models (e.g., probabilistic models) that take as input values the request data and the client ID (e.g., as a feature vector) to determine an output of the intent. The output may be a plurality of classifications with a plurality of confidence percentages, and the context processing engine 310b may select a classification with a highest confidence percentage as the intent or a classification with a highest confidence percentage greater than a threshold minimum. In the case the knowledge database determines matched mapping or the behavior models determine a classification above the threshold minimum, the context processing engine 310b determines the intent. In the case the knowledge database does not determine matched mapping or the behavior models do not determine a classification above the threshold minimum, the context processing engine 310b does not determine the intent. In the case that the intent is determined, the context processing engine 310b proceeds to process the request further, as discuss below. In the case that no intent is determined, the context processing engine 310b transmits a response indicating no intent was determined, and then wait for a next request 320 to process. Therefore, the API manager improves efficiency by (1) exiting the process when it is determined the extracted client ID does not map to an API invocations using the ID-API mapping data and (2) exiting the process without further processing a request that has no intent (or no intent that is clear, e.g., with a confidence greater than the minimum threshold), which would require additional processing in the FMS SaaS and may result in decreasing accuracy. Therefore, proceeding with requests 320 with known intent would also improve accuracy of services offered by the FMS SaaS as compared to unknown intent.

The context processing engine 310b of the API manager, to analyze the request to determine the context of the request: obtains the contextual data associated with the client 315 from the FMS SaaS 146c; and analyzes the request data and/or the contextual data to determine the context and a priority for the request.

For instance, the context processing engine 310b obtains the contextual data associated with the client 315 by: obtaining a certificate ID, device ID, and/or user ID of the client 315 (from the request 320 as discussed above); and searching all data (or a subset of all data, such as only recent data within a threshold time or for scheduled flights of an aircraft) of the FMS SaaS 146c for data associated with the certificate ID, the device ID, and/or the user ID. In this manner, the context processing engine 310b determines relevant flight routes; aircraft (own vehicle and others); positions, heading, speed, flight plans, waypoints etc. of the aircraft; persons (e.g., pilots, crew, etc.) associated with the own aircraft; arrival and departure locations for the aircraft; nearby locations (such as other destinations); times (e.g., expected arrival to waypoint or destination); visibility (e.g., cloud coverage, fog, day versus night), weather (e.g., as it changes along a route); maintenance, failure, and/or warning alerts (e.g., as reported by automated systems or users); etc. (generally, "contextual parameters"). The context processing engine 310b analyzes the request data and/or the contextual data to determine the context and the priority for the request by: analyzing the request data for additional contextual parameters (or new values for current contextual parameters), and analyzing the contextual parameters (as updated, if so based on the request data) to determine the context and the priority.

For instance, the context processing engine 310b uses a second knowledge database and/or second behavior models. The second knowledge database includes second mapping data including defined relationships between particular inputs (e.g., particular contextual parameter) and particular outputs (determine a particular context and particular priority). The behavior models are statistical models and/or machine learning models (e.g., probabilistic models) that take as input values the contextual parameters and the client ID (e.g., as a feature vector) to determine an output of the context and the priority. The output may be a plurality of classifications with a plurality of confidence percentages, and the context processing engine 310b may select a classification with a highest confidence percentage as the context and the priority, or a classification with a highest confidence percentage greater than a threshold minimum (which may the same of different than the threshold minimum discussed above). In the case the knowledge database determines matched mapping or the behavior models determine a classification above the threshold minimum, the context processing engine 310b determines the context and the priority. In the case the knowledge database does not determine matched mapping or the behavior models do not determine a classification above the threshold minimum, the context processing engine 310b does not determine the context and priority. In the case that the context and priority are determined, the context processing engine 310b proceeds to process the request further, as discuss below. In the case that no context and priority are determined, the context processing engine 310b transmits a response indicating no context and priority was determined, and then wait for a next request 320 to process. Alternatively, in the case that no context and priority are determined, the context processing engine 310b proceeds to determine a context as a normal operating context (as opposed to emergency context, fire context, medical emergency, non-responsive equipment context, etc.) and priority as a normal priority (for a given intent) (as opposed to low or high priority).

Therefore, the API manager improves efficiency by exiting the process executing the process without further processing a request that has no context and/or priority (or no intent that is clear, e.g., with a confidence greater than the minimum threshold), which would require additional processing in the FMS SaaS and may result in decreasing accuracy. Therefore, proceeding with requests 320 with known context and/or priority would also improve accuracy of services offered by the FMS SaaS as compared to unknown intent. Moreover, determining context and intent using knowledge database(s) and/or behavior model(s), along with the contextual data (e.g., FMS internal state data and/or inputs from, e.g., systems/sensors, that get fed in at various phases of flight for an aircraft associated with the client 315) avoids re-recertifying FMS systems (e.g., the FMS SaaS and/or the FMS onboard an aircraft), thus avoiding onerous costs and delays. For instance, updating the knowledge database(s) and/or behavior model(s) could be in the form of fine-tuning a knowledge base that gets built and refined over time through training FMS intent classification models. In one aspect of the disclosure (e.g., using the behavior model(s)), the idea is not to hardwire the interactions between FMS SaaS and clients 315 (e.g., external systems), as any change in the interaction might result in re-certifying the FMS, which will be very costly in terms of time and effort. Furthermore, identifying the intent also allows prioritization of services offered by FMS to various clients 315, so that requests that should receive more urgent responses may be responded to out of turn or that requests that can receive less urgent responses may be responded to in regular turn or in case a more urgent response is needed before the less urgent response.

The context processing engine 310b of the API manager, to transmit the message to the particular functionality of the FMS SaaS based on the context and the intent: generates the message in accordance with an API protocol to include action data and a priority level; and transmits the message to the particular functionality of the FMS SaaS that corresponds to the particular API invocation of the FMS SaaS. The API protocol may be the same as API protocol as for the API endpoints discussed above or different. The action data is based on the context and the intent. For instance, the action data may include new contextual parameters (as based on the request data) and indicate a current context (e.g., emergency situation) to inform the particular API functionality of changes in context. The priority level is based on the priority determined above. As the contextual parameters may indicate a more urgent priority (or a less urgent priority) than would be typically assumed for an intent, the context processing engine 310b may escalate or deescalate a processing time and response time of the response. Therefore, the API manager improves efficiency and accuracy by determining an appropriate priority and context, as emergency contexts that are mislabeled reduce processing time needed in emergency situations and reduce accuracy of the FMS SaaS as relevant data is not being used.

The authorization agent 310e of the API manager, to determine whether the client 315 is associated with a subscription type: requests from the applications registry 305 the subscription type of the client 315, and/or accesses a repository of the authorization agent 310e to retrieve the subscription type for the client 315; and in response to obtaining the subscription type from the applications registry 305 or the repository of the authorization agent 310e, determines the client 315 is associated with the subscription type.

For instance, the repository of the authorization agent 310e be updated by the applications registry 305 to include subscription types for the plurality of clients 315 or subscription types of clients 315 associated with the enterprise 160, as discussed above. Moreover, the authorization agent 310e retrieves the subscription type for the client 315 from the repository by matching a certificate ID, device ID, and/or a user ID (included in the request 320 and parsed out from the request) to stored certificate IDs, device IDs and/or user IDs stored in a mapped relationship to unique certificates. Therefore, the API manager improves efficiency by using the repository that is periodically updated within the API manager, as compared to requesting the subscription type from the applications registry 305.

Figure 3D:
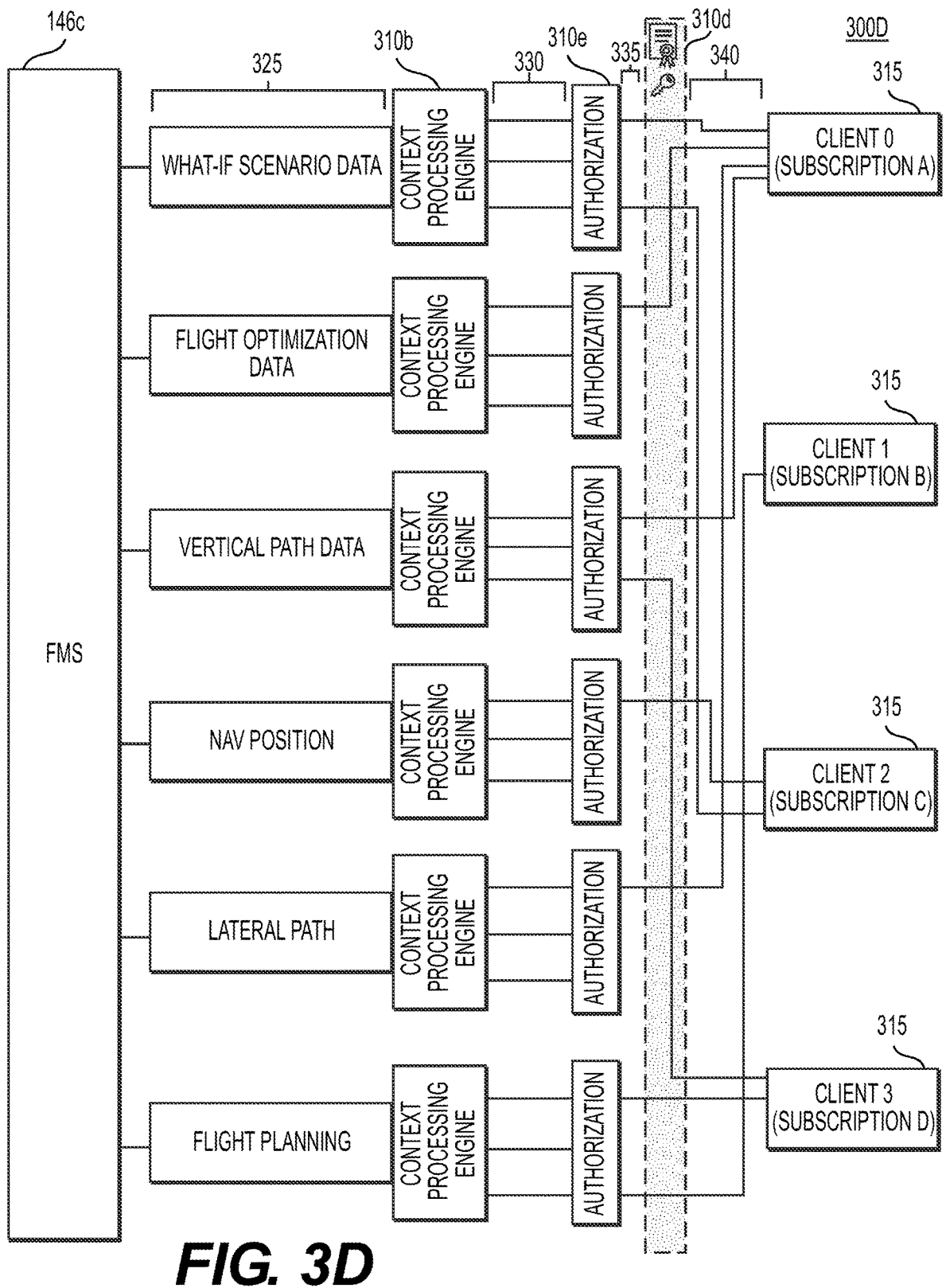

Turning to FIG. 3D, FIG. 3D depicts generating responses 340 to requests 320 by the API manager. In particular, the API manager: filters data stream 325 from the FMS SaaS 146c in accordance with the subscription type and the context to obtain separated data streams 330; obtains a set of permissions based on the subscription type, the permissions including at least permitted data types; determines whether there are data types that match the permitted data types in the separated data streams 330; in response to determining there are data types that match the permitted data types in the separated data streams 330, extracts individual data packets 335 from the separated data streams in accordance with the data types that match the permitted data types; sets the individual data packets 335 as the filtered data stream; generates a response 340 based on the filtered data stream; and transmits the response 340 to the client 315.

To filter the data stream from the FMS SaaS in accordance with the context, the context processing engine 310b: separates the data stream 325 from the FMS SaaS based on the context into separated data streams 330. For instance, the context processing engine 310b separates the data stream 325 into separated data streams 330 corresponding to contexts: for all clients 315; all clients 315 that are in active use (e.g., onboard an aircraft in active use or associated with an aircraft in active use); all clients 315 that have recently transmitted a request (e.g., less than a threshold period of time has elapsed since the request was received); or all clients 315 that have pending requests (e.g., that have not had a response transmitted yet to a request 320). As an example, the FMS SaaS receives a data stream that includes (e.g., a continuous or periodic output) data of flight planning functionality, data of lateral path planning functionality, data of navigation position functionality, data of vertical path navigation functionality, data of flight optimization functionality, and/or data of What-If scenario functionality; determine that particular parts of the data stream are relevant to a context of an client 315; and separate the data stream containing the particular parts that are relevant to the context of the client 315.

Moreover, as further embodiment, the API gateway 310 may include a cache to store previously transmitted responses 440 for a particular time frame (e.g., one day) or in particular manner (first in first out, etc.), and the context processing engine 310b may automatically transmit a response to a new request 320 with a same or similar context, as the relevant data is cached in the API gateway 310, without having to wait for the data stream from the FMS SaaS. Therefore, the API gateway 310 may be more efficient in computations on the FMS SaaS without transmitting the message To filter the data stream from the FMS SaaS in accordance with the subscription type, the authorization agent 310e: obtains the set of permissions based on the subscription type, the permissions including at least permitted data types; determines whether there are data types that match the permitted data types in the separated data streams 330; in response to determining there are data types that match the permitted data types in the separated data streams 330, extracts individual data packets 335 from the separated data streams 330 in accordance with the data types that match the permitted data types; and sets the individual data packets 335 as the filtered data stream.

For instance, the authorization agent 310e obtains the set of permissions based on the subscription type by referencing a particular set of permissions for a particular subscription type stored in the repository of the authorization agent 310e. As indicated above, the set of permissions may be for different functionality, quantity/rate, time of day, etc., and the authorization agent 310e checks each permission by using the permission rules. If the permission rules return disapproval to proceed, the authorization agent 310e transmits a response indicating no permission for the requested service, request rate exceeded, time of day invalid, etc. If the permission rules return approval to proceed, the authorization agent 310e determines whether there are data types that match the permitted data types in the separated data streams 330 by matching functionality data types of the separated data streams 330 to permitted functionality data types of the permission rules/subscription type. If there are no matching data types, the authorization agent 310e transmits a response indicating no responsive data. If there are matching data types, the authorization agent 310e extracts individual data packets 335 from the separated data streams 330 in accordance with the data types that match the permitted data types by parsing the separated data streams and extracting the individual data packets 335 that are for the matching data types. The authorization agent 310e then sets the individual data packets 335 as the filtered data stream. Therefore, the API manager improves accuracy as by selecting only items that are relevant and allowed to be accessed by client 315.

The certificate manager 310d then generates a response 340 based on the filtered data stream; and transmits the response 340 to the client 315. For instance, the certificate manager 310d encrypts the filtered data stream using a public key of a unique certificate of the client 315 that requested the request 320 and a private key of the certificate manager 310d. The certificate manager 310d also generates the response in accordance with the API protocol by including the encrypted data with relevant header data and/or meta data (e.g., indicating a destination client 315 or to which request the response is regarding). The client 315 performs a data integrity check of the output by performing a decryption algorithm using a unique certificate of the API gateway indicated by the API gateway and stored on the applications registry 305. The client 315 may also perform a data validity check by cross-checking (e.g., confirming) on an on-board or other resource that the output is appropriate. Therefore, the API manager improves security by using a public certificate and private key to ensure data output is not tampered with.

The topic filter 310a is used by the context processing engine 310b to generate metadata regarding the request 320 and/or the contextual parameters while determining the intent, the context, and the priority. The metadata may indicate topics that are likely indicated by the request data, such as based on the API functionality being requested and/or natural language processing of the request data. The metadata may be used as further inputs to the functions of the first knowledge database, the first behavior models, the second knowledge database, and/or the second behavior models.

The logging and monitoring module 310f stores a record (in whole or in part) of requests 320 received, responses 340 generated, and determined intent, context, and priority (or failure to determine the intent, context, and priority). The logging and monitoring module 310f is used by later analyses to refine/update the first knowledge database, the first behavior models, the second knowledge database, and/or the second behavior models (for, e.g., failures), thereby improving an accuracy of the first knowledge database, the first behavior models, the second knowledge database, and/or the second behavior models.

Figure 4:
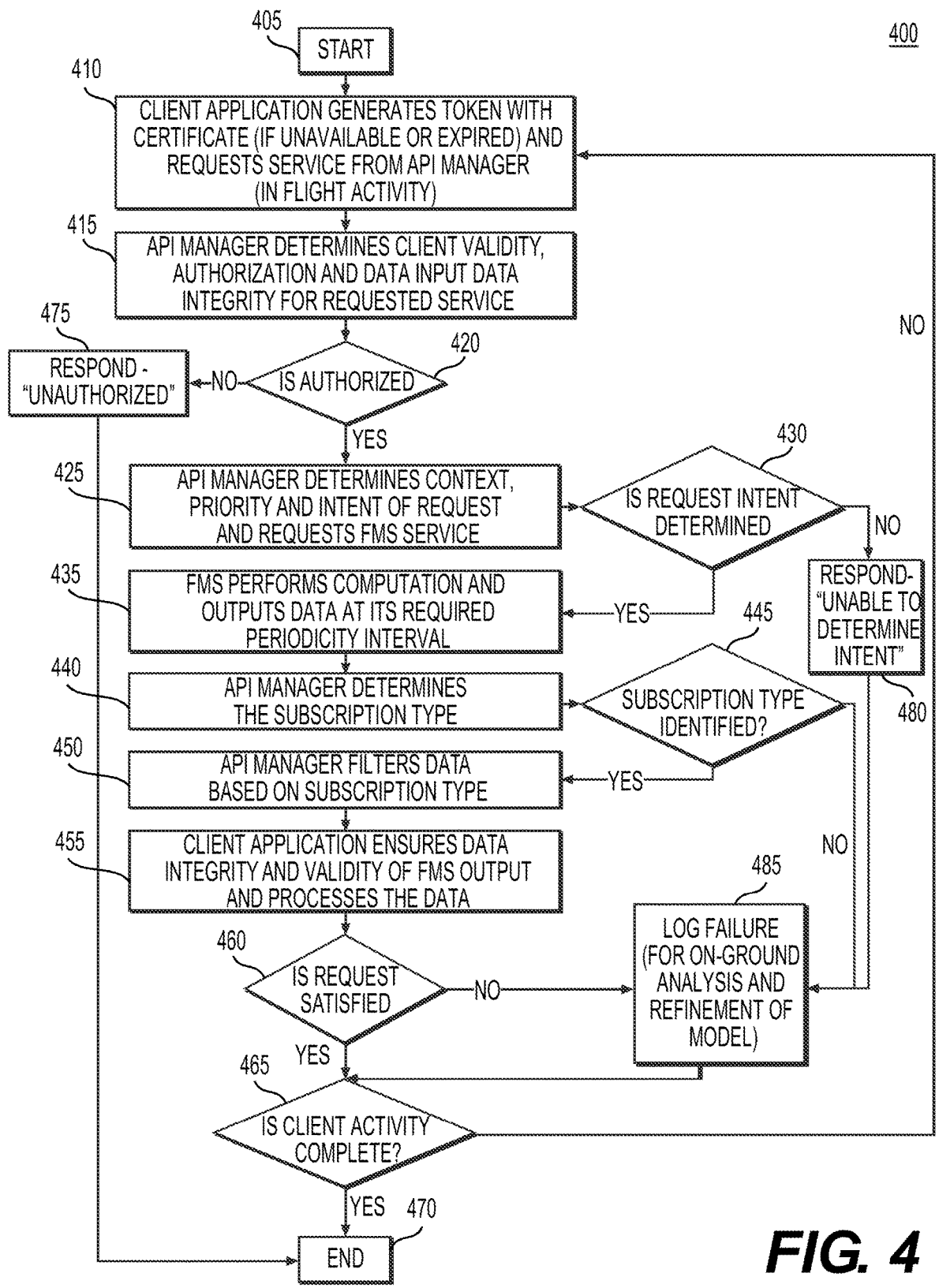
FIG. 4 depicts a flowchart for context-specific granular access to FMS SaaS using adaptive IAM, according to one or more embodiments.

FIG. 4 depicts a flowchart for context-specific granular access to FMS SaaS servers using adaptive IAM, according to one or more embodiments. In particular, the flowchart 400 of FIG. 4 is performed by a client application of an client 315 (as discussed above), the API manager of the API gateway 310, and the FMS SaaS 146c. The flowchart 400 starts (Block 405) then proceed to the client 315 to generate a token with unique certificate (if unavailable or expired) and requests service from the API Manager (e.g., for in flight activity) (Block 410).

The flowchart 400 proceeds to the API manager to determine whether client validity, authorization, and data input data integrity for requested service are correct (Block 415). If so (Block 420: Yes), the API manager proceeds to determine context, priority and intent of request and requests FMS Service (Block 425). If not authorized (Block 420: No), the API manager proceeds to respond indicating not authorized to the client 315 (Block 475). After sending the response indicating not authorized (Block 475), the API manager proceeds to end (Block 470).

In the case that the API manager proceeds to determine context, priority and intent of request and requests FMS Service (Block 425), the API manager proceeds to determine whether an intent is determined (Block 430). If intent is determined (Block 430: Yes), the flowchart proceeds to the FMS SaaS 146c to perform computations and outputs data at its required periodicity interval (Block 235). If intent is not determined (Block 430: No), the API manager proceeds to respond indicating that API manager was unable to determine intent (Block 480). After sending the response indicating that API manager was unable to determine intent (Block 480), the API manager proceeds to log failure (e.g., for on-ground analysis and refinement of model) (Block 485), then proceed to log failure (e.g., for on-ground analysis and refinement of model) (Block 485), then the client 315 determines whether a client activity is complete (Block 465), and then to end the flowchart 400 (Block 470).

After determining that the intent was determined (Block 430: Yes), after (or while) the FMS SaaS 14bc has performed computations (Block 435), the API manager proceeds to determine the subscription type (Block 440). The API manager then proceeds to determine whether the subscription type is identified (Block 445). If the subscription type is identified (Block 445: Yes), the API manager then proceeds to filter data based on subscription type (Block 450). If the subscription type is not identified (Block 445: No), the API manager then proceeds to log failure (e.g., for on-ground analysis and refinement of model) (Block 485), then the client 315 determines whether a client activity is complete (Block 465), and then the flowchart 400 ends (Block 470).

In the case that the API manager proceeds to filter data based on subscription type (Block 450), the API manager transmits a response to the client 315, and the client 315 proceeds to ensure data integrity and validity of FMS output and processes the data (Block 455).

After the client 315 proceeds to ensure data integrity and validity of FMS output and processes the data (Block 455), the client 315 proceeds to determine whether the request is satisfied (Block 460). If the request is not satisfied (Block

460: No), the client 315 proceeds to log failure (e.g., for on-ground analysis and refinement of model) (Block 485), then the client 315 determines whether a client activity is complete (Block 465), and then the flowchart 400 ends (Block 470).

If the request is satisfied (Block 460: Yes), the client 315 determines whether a client activity is complete (Block 465). If client activity is not complete (Block 465: No), the client 315 proceeds to generate a token with a unique certificate (if unavailable or expired) and requests service from the API Manager (e.g., for in flight activity) (Block 410), thus re-starting the flowchart 400. If client activity is complete (Block 465: Yes), the client 315 proceeds to end the flowchart 400.

Figure 5:
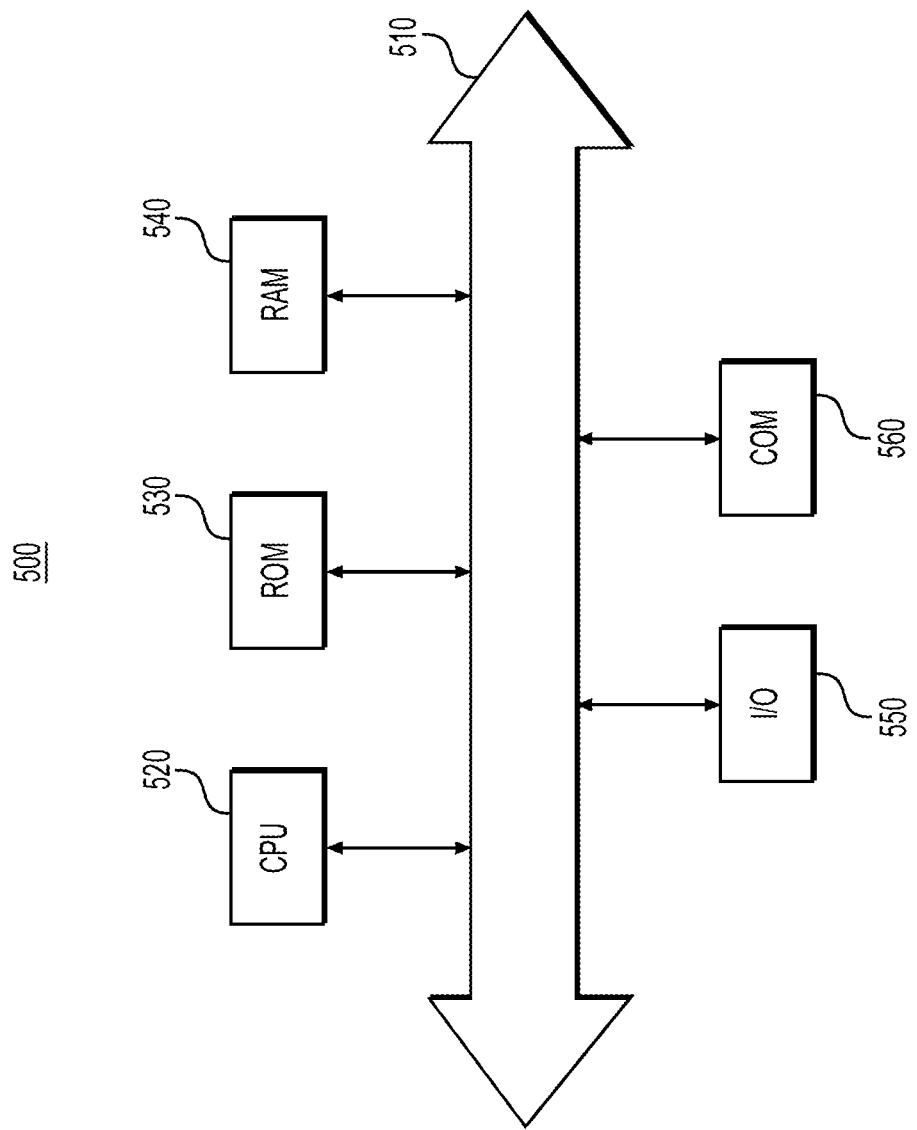
FIG. 5 depicts an example system that may execute techniques presented herein.

FIG. 5 depicts an example system 500 that may execute techniques presented herein. FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform also may include a central processing unit ("CPU") 520, in the form of one or more processors, for executing program instructions. The platform may include an internal communication bus 510, and the platform also may include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

In this disclosure, relative terms, such as, for example, "about," "substantially," "generally," and "approximately" are used to indicate a possible variation of ±10% in a stated value.

The term "exemplary" is used in the sense of "example" rather than "ideal." "One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, comprising:
   receiving, at one of a plurality of application programing interface (API) endpoints of a flight management system (FMS) software as a service (SaaS), a request from a client;
   determining whether the request is authorized;
   in response to determining the request is authorized, analyzing the request to determine a context of the request and determine whether the request includes an intent;
   in response to determining the context and determining the request includes the intent, generating a message in accordance with an API protocol to include action data and a priority level, and transmitting the message to a particular functionality of the FMS SaaS based on the context and the intent, wherein the action data is based on the context and the intent;
   in response to determining the request includes the intent, determining whether the client is associated with a subscription type;
   in response to determining the client is associated with the subscription type, filtering a data stream from the FMS SaaS in accordance with the subscription type and the context;
   generating a response based on the filtered data stream; and
   transmitting the response to the client.

2. The method of claim 1, wherein the determining whether the request is authorized includes:
   performing one or both of:
       requesting from an identity and access management (IAM) system a unique certificate for the client, and/or
       accessing a certificate manager to retrieve the unique certificate for the client, the certificate manager being updated by the IAM system to include unique certificates for a plurality of clients;
   in response to obtaining the unique certificate from the IAM system or the certificate manager, processing the request to obtain a token;
   determine whether the token is valid based on the unique certificate and a private key of FMS SaaS; and
   in response to determining the token is valid, determining the request is authorized.

3. The method of claim 1, wherein the analyzing the request to determine whether the request includes the intent includes:
   processing the request to obtain a token and request data from the request;
   analyzing the token to determine whether the token includes a client identification (ID) corresponding to a particular API invocation of the FMS SaaS; and
   in response to determining the token includes the client ID, analyzing the request data and the client ID to determine the intent.

4. The method of claim 3, wherein the analyzing the request to determine the context of the request includes:
   obtaining contextual data associated with the client from the FMS SaaS; and
   analyzing the request data and/or the contextual data to determine the context and a priority for the request.

5. The method of claim 4, wherein the transmitting the message to the particular functionality of the FMS SaaS based on the context and the intent includes:
   transmitting the message to the particular functionality of the FMS SaaS that corresponds to the particular API invocation of the FMS SaaS, wherein the priority level is based on the priority.

6. The method of claim 1, wherein the determining whether the client is associated with the subscription type includes:
   performing one or both of:
       requesting from an identity and access management (IAM) system the subscription type of the client, and/or
       accessing an authorization agent to retrieve the subscription type for the client, the authorization agent being updated by the IAM system to include subscription types for a plurality of clients; and in response to obtaining the subscription type from the IAM system or the authorization agent, determining the client is associated with the subscription.

7. The method of claim 1, wherein the filtering the data stream from the FMS SaaS in accordance with the subscription type and the context includes:
separating the data stream from the FMS SaaS based on the context into separated data streams;
obtaining a set of permissions based on the subscription type, the permissions including at least permitted data types;
determining whether there are data types that match the permitted data types in the separated data streams;
in response to determining there are data types that match the permitted data types in the separated data streams, extracting individual data packets from the separated data streams in accordance with the data types that match the permitted data types; and
setting the individual data packets as the filtered data stream.

8. A system, comprising:
at least one memory storing instructions; and
at least one processor executing the instructions to perform a process including:
receiving, at one of a plurality of application programing interface (API) endpoints of a flight management system (FMS) software as a service (SaaS), a request from a client;
determining whether the request is authorized;
in response to determining the request is authorized, analyzing the request to determine a context of the request and determine whether the request includes an intent;
in response to determining the context and determining the request includes the intent, generating a message in accordance with an API protocol to include action data and a priority level, and transmitting the message to a particular functionality of the FMS SaaS based on the context and the intent, wherein the action data is based on the context and the intent;
in response to determining the request includes the intent, determining whether the client is associated with a subscription type;
in response to determining the client is associated with the subscription type, filtering a data stream from the FMS SaaS in accordance with the subscription type and the context;
generating a response based on the filtered data stream; and
transmitting the response to the client.

9. The system of claim 8, wherein the process further includes, to determine whether the request is authorized:
performing one or both of:
requesting from an identity and access management (IAM) system a unique certificate for the client, and/or
accessing a certificate manager to retrieve the unique certificate for the client, the certificate manager being updated by the IAM system to include unique certificates for a plurality of clients;
in response to obtaining the unique certificate from the IAM system or the certificate manager, processing the request to obtain a token;
determine whether the token is valid based on the unique certificate and a private key of FMS SaaS; and
in response to determining the token is valid, determining the request is authorized.

10. The system of claim 8, wherein the process further includes, to analyze the request to determine whether the request includes the intent:
processing the request to obtain a token and request data from the request;
analyzing the token to determine whether the token includes a client identification (ID) corresponding to a particular API invocation of the FMS SaaS; and
in response to determining the token includes the client ID, analyzing the request data and the client ID to determine the intent.

11. The system of claim 10, wherein the process further includes, to analyze the request to determine the context of the request:
obtaining contextual data associated with the client from the FMS SaaS; and
analyzing the request data and/or the contextual data to determine the context and a priority for the request.

12. The system of claim 11, wherein the process further includes, to transmit the message to the particular functionality of the FMS SaaS based on the context and the intent:
transmitting the message to the particular functionality of the FMS SaaS that corresponds to the particular API invocation of the FMS SaaS, wherein the priority level is based on the priority.

13. The system of claim 8, wherein the process further includes, to determine whether the client is associated with the subscription type:
performing one or both of:
requesting from an identity and access management (IAM) system the subscription type of the client, and/or
accessing an authorization agent to retrieve the subscription type for the client, the authorization agent being updated by the IAM system to include subscription types for a plurality of clients; and
in response to obtaining the subscription type from the IAM system or the authorization agent, determining the client is associated with the subscription.

14. The system of claim 8, wherein the process further includes, to filter the data stream from the FMS SaaS in accordance with the subscription type and the context:
separating the data stream from the FMS SaaS based on the context into separated data streams;
obtaining a set of permissions based on the subscription type, the permissions including at least permitted data types;
determining whether there are data types that match the permitted data types in the separated data streams;
in response to determining there are data types that match the permitted data types in the separated data streams, extracting individual data packets from the separated data streams in accordance with the data types that match the permitted data types; and
setting the individual data packets as the filtered data stream.

15. A non-transitory computer-readable medium storing instructions that, when executed by a processor, cause the processor to perform a method, the method comprising:
receiving, at one of a plurality of application programing interface (API) endpoints of a flight management system (FMS) software as a service (SaaS), a request from a client;
determining whether the request is authorized;

in response to determining the request is authorized, analyzing the request to determine a context of the request and determine whether the request includes an intent;

in response to determining the context and determining the request includes the intent, generating a message in accordance with an API protocol to include action data and a priority level, and transmitting the message to a particular functionality of the FMS SaaS based on the context and the intent, wherein the action data is based on the context and the intent;

in response to determining the request includes the intent, determining whether the client is associated with a subscription type;

in response to determining the client is associated with the subscription type, filtering a data stream from the FMS SaaS in accordance with the subscription type and the context;

generating a response based on the filtered data stream; and transmitting the response to the client.

16. The non-transitory computer-readable medium of claim 15, wherein the analyzing the request to determine whether the request includes the intent includes:

processing the request to obtain a token and request data from the request;

analyzing the token to determine whether the token includes a client identification (ID) corresponding to a particular API invocation of the FMS SaaS; and in response to determining the token includes the client ID, analyzing the request data and the client ID to determine the intent.

17. The non-transitory computer-readable medium of claim 16, wherein the analyzing the request to determine the context of the request includes:

obtaining contextual data associated with the client from the FMS SaaS; and analyzing the request data and/or the contextual data to determine the context and a priority for the request.

18. The non-transitory computer-readable medium of claim 17, wherein the transmitting the message to the particular functionality of the FMS SaaS based on the context and the intent includes:

transmitting the message to the particular functionality of the FMS SaaS that corresponds to the particular API invocation of the FMS SaaS, wherein the priority level is based on the priority.

19. The non-transitory computer-readable medium of claim 15, wherein the determining whether the client is associated with the subscription type includes:

performing one or both of:

requesting from an identity and access management (IAM) system the subscription type of the client, and/or accessing an authorization agent to retrieve the subscription type for the client, the authorization agent being updated by the IAM system to include subscription types for a plurality of clients; and in response to obtaining the subscription type from the IAM system or the authorization agent, determining the client is associated with the subscription.

20. The non-transitory computer-readable medium of claim 15, wherein the filtering the data stream from the FMS SaaS in accordance with the subscription type and the context includes:

separating the data stream from the FMS SaaS based on the context into separated data streams;

obtaining a set of permissions based on the subscription type, the permissions including at least permitted data types;

determining whether there are data types that match the permitted data types in the separated data streams;

in response to determining there are data types that match the permitted data types in the separated data streams, extracting individual data packets from the separated data streams in accordance with the data types that match the permitted data types; and setting the individual data packets as the filtered data stream.

* * * * *